(12) United States Patent
Simonds (10) Patent No.: US 10,294,808 B2
(45) Date of Patent: May 21, 2019

(54) FASTENER RETENTION MECHANISM

(71) Applicant: United Technologies Corporation, Farmington, CT (US)

(72) Inventor: Mark E. Simonds, Cape Neddick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 462 days.

(21) Appl. No.: 15/134,990

(22) Filed: Apr. 21, 2016

(65) Prior Publication Data
US 2017/0306776 A1    Oct. 26, 2017

(51) Int. Cl.
*F01D 25/24* (2006.01)
*F01D 9/04* (2006.01)
*F16B 37/14* (2006.01)

(52) U.S. Cl.
CPC .......... *F01D 9/042* (2013.01); *F01D 25/243* (2013.01); *F16B 37/14* (2013.01); *F05B 2260/301* (2013.01); *F05D 2220/32* (2013.01); *F05D 2230/60* (2013.01); *F05D 2240/12* (2013.01); *F05D 2240/55* (2013.01); *F05D 2260/30* (2013.01); *F05D 2260/31* (2013.01); *F05D 2260/97* (2013.01)

(58) Field of Classification Search
None
See application file for complete search history.

(56) References Cited

U.S. PATENT DOCUMENTS

| | | | |
|---|---|---|---|
| 3,727,660 A | | 4/1973 | Burge |
| 3,824,034 A | * | 7/1974 | Leicht ................ F01D 9/042 |
| | | | 415/209.2 |
| 4,883,407 A | * | 11/1989 | Touze ................ F01D 5/066 |
| | | | 415/190 |

(Continued)

FOREIGN PATENT DOCUMENTS

| | | |
|---|---|---|
| EP | 1640565 A2 | 3/2006 |
| EP | 2261467 A2 | 12/2010 |
| GB | 2489727 A | 10/2012 |

OTHER PUBLICATIONS

European Search Report for Application No. 17167356.9-1610; dated Oct. 12, 2017; Report dated Oct. 18, 2017; 1-6 pages.

*Primary Examiner* — Jason D Shanske
*Assistant Examiner* — Theodore C Ribadeneyra
(74) *Attorney, Agent, or Firm* — Cantor Colburn LLP (57) ABSTRACT

A fastener retention mechanism for retaining fasteners of a stator assembly in a gas turbine engine is provided. The fastener retention mechanism including: a base having a first rail, a second rail, and a base surface extending therebetween, the first rail and second rail being in a facing spaced relationship with respect to each other and define a channel extending therebetween; a cover releasably connected to the base, the cover having a first foot, second foot, and cover surface extending between the first foot and second foot, wherein the first foot and second foot are configured to interlock with the first rail and second rail, respectively, such that the channel is covered by the cover surface when the cover is secured to the base; and wherein the cover is secured to the base by the interlocking of the first foot and second foot with the first rail and second rail.

20 Claims, 5 Drawing Sheets

(56) References Cited

U.S. PATENT DOCUMENTS

| | | | | |
|---|---|---|---|---|
| 4,904,156 A | * | 2/1990 | Touze | F01D 5/066 415/190 |
| 5,141,394 A | * | 8/1992 | Donlan | F01D 25/246 415/190 |
| 5,259,725 A | * | 11/1993 | Hemmelgarn | F01D 11/005 29/450 |
| 6,558,114 B1 | * | 5/2003 | Tapley | F01D 5/081 415/111 |
| 7,704,038 B2 | * | 4/2010 | Ring | F01D 25/14 415/112 |
| 2012/0257958 A1 | * | 10/2012 | Norton | F01D 5/025 415/108 |

* cited by examiner

FASTENER RETENTION MECHANISM

STATEMENT REGARDING FEDERALLY SPONSORED RESEARCH OR DEVELOPMENT

This invention was made with government support under Contract No. N00019-02-C-3003 awarded by the United States Department of the Navy and FA8626-15-D-0015-3501 awarded by the United States Department of the Air Force. The government has certain rights in the invention.

BACKGROUND

The subject matter disclosed herein generally relates to gas turbine engines and, more particularly, to retention of fasteners for securing guide vanes internal to gas turbine engines.

Some gas turbine engines may include stator assemblies having guide vanes to direct the airflow to compressor or turbine airfoils. The guide vanes are typically attached to an inner air seal carrier through various fasteners, such as for example self-locking nuts and bolts. The self-locking feature of the fasteners serves as a primary source of retention but secondary sources of retention may be incorporated for added security, such as, for example, lock wire and silicone rubber. Utilizing lock wire to secure the self-locking nut to the bolt as a secondary source of retention creates an additional source of drag in the system due to the lock wire being in the airflow path. Utilizing silicone rubber to secure the self-locking nut to the bolt as a secondary source of retention is a low drag alternative to lock wire, however the rubber may erode over time and create an additional source drag.

Accordingly, it is desirable to provide a fastener retaining mechanism that does not create an additional source of drag.

SUMMARY

According to one embodiment, a fastener retention mechanism for retaining fasteners of a stator assembly in a gas turbine engine is provided. The fastener retention mechanism having: a base having a first rail and a second rail and a base surface extending therebetween, the first rail and the second rail being in a facing spaced relationship with respect to each other and define a channel extending therebetween; a cover releasably connected to the base, the cover having a first foot, a second foot, and a cover surface extending between the first foot and the second foot, wherein the first foot and the second foot are configured to interlock with the first rail and the second rail, respectively, such that the channel is covered by the cover surface when the cover is secured to the base; and wherein the cover is secured to the base by the interlocking of the first foot and the second foot with the first rail and the second rail.

In addition to one or more of the features described above, or as an alternative to any of the foregoing embodiments, the cover may be formed from an elastically deformable material having resilient properties.

In addition to one or more of the features described above, or as an alternative to any of the foregoing embodiments, the cover and the base may be elongated members having an arcuate shape.

In addition to one or more of the features described above, or as an alternative to any of the foregoing embodiments, the cover and the base may have a rectangular profile.

In addition to one or more of the features described above, or as an alternative to any of the foregoing embodiments, the cover surface may be configured to reduce drag of the stator assembly.

In addition to one or more of the features described above, or as an alternative to any of the foregoing embodiments, the first rail and the second rail may each have a ledge configured to engage a ledge of the first foot and the second foot, respectively.

In addition to one or more of the features described above, or as an alternative to any of the foregoing embodiments, having an anti-rotation member secured to the base, the anti-rotation member may be configured to prevent rotational movement of the cover with respect to the base when the cover is secured to the base.

In addition to one or more of the features described above, or as an alternative to any of the foregoing embodiments, the cover has a notch portion at one end, the notch portion being configured to engage the anti-rotation member when the cover is secured to the base.

In addition to one or more of the features described above, or as an alternative to any of the foregoing embodiments, the cover and the base are each elongated U shaped members.

According to another embodiment, a stator assembly for a gas turbine engine is provided. The stator assembly having: an inner air seal carrier having a mounting body; a plurality of guide vanes secured to the mounting body via a plurality of fasteners; and a fastener retention mechanism secured to the mounting body via the plurality of fasteners, the fastener retention mechanism having: a base having a first rail and a second rail and a base surface extending therebetween, the first rail and the second rail being in a facing spaced relationship with respect to each other and define a channel extending therebetween; a cover releasably connected to the base, the cover having a first foot, a second foot, and a cover surface extending between the first foot and the second foot, wherein the first foot and the second foot are configured to interlock with the first rail and the second rail, respectively, such that the channel is covered by the cover surface when the cover is secured to the base; wherein the cover is secured to the base by the interlocking of the first foot and the second foot with the first rail and the second rail; and wherein portions of the plurality of fasteners are enclosed between the cover and the base.

In addition to one or more of the features described above, or as an alternative to any of the foregoing embodiments, the cover may be formed from an elastically deformable material having resilient properties.

In addition to one or more of the features described above, or as an alternative to any of the foregoing embodiments, the cover and the base are elongated members having an arcuate shape.

In addition to one or more of the features described above, or as an alternative to any of the foregoing embodiments, the cover and the base may have a rectangular profile.

In addition to one or more of the features described above, or as an alternative to any of the foregoing embodiments, the cover surface may be configured to reduce drag of the stator assembly.

In addition to one or more of the features described above, or as an alternative to any of the foregoing embodiments, the first rail and the second rail each have a ledge configured to engage a ledge of the first foot and the second foot, respectively.

In addition to one or more of the features described above, or as an alternative to any of the foregoing embodiments, further including an anti-rotation member secured to the"

base, wherein the anti-rotation member is configured to prevent rotational movement of the cover with respect to the base when the cover is secured to the base.

In addition to one or more of the features described above, or as an alternative to any of the foregoing embodiments, the cover has a notch portion at one end, the notch portion being configured to engage the anti-rotation member when the cover is secured to the base.

According to another embodiment, a method for encasing a plurality of fasteners securing a plurality of guide vanes to a mounting body of an inner air seal carrier is provided. The method includes the steps of: securing the plurality of guide vanes to the mounting body via the plurality of fasteners; simultaneously securing a base of a fastener retention mechanism to the mounting body via the plurality of fasteners, the base having a first rail and a second rail and a base surface extending therebetween, the first rail and the second rail being in a facing spaced relationship with respect to each other to define a channel extending therebetween and wherein portions of the fasteners are located in the channel; and releasably securing a cover to the base, the cover having a first foot, a second foot, and a cover surface extending between the first foot and the second foot, wherein the first foot and the second foot are configured to interlock with the first rail and the second rail, respectively, such that the channel is covered by the cover surface when the cover is secured to the base; wherein the cover is secured to the base by the interlocking of the first foot and the second foot with the first rail and the second rail; and wherein the portions of the fasteners located in the channel are enclosed between the cover and the base when the cover is secured to the base.

In addition to one or more of the features described above, or as an alternative to any of the foregoing embodiments, the cover may be formed from an elastically deformable material having resilient properties.

In addition to one or more of the features described above, or as an alternative to any of the foregoing embodiments, the cover and the base are elongated members having an arcuate shape.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
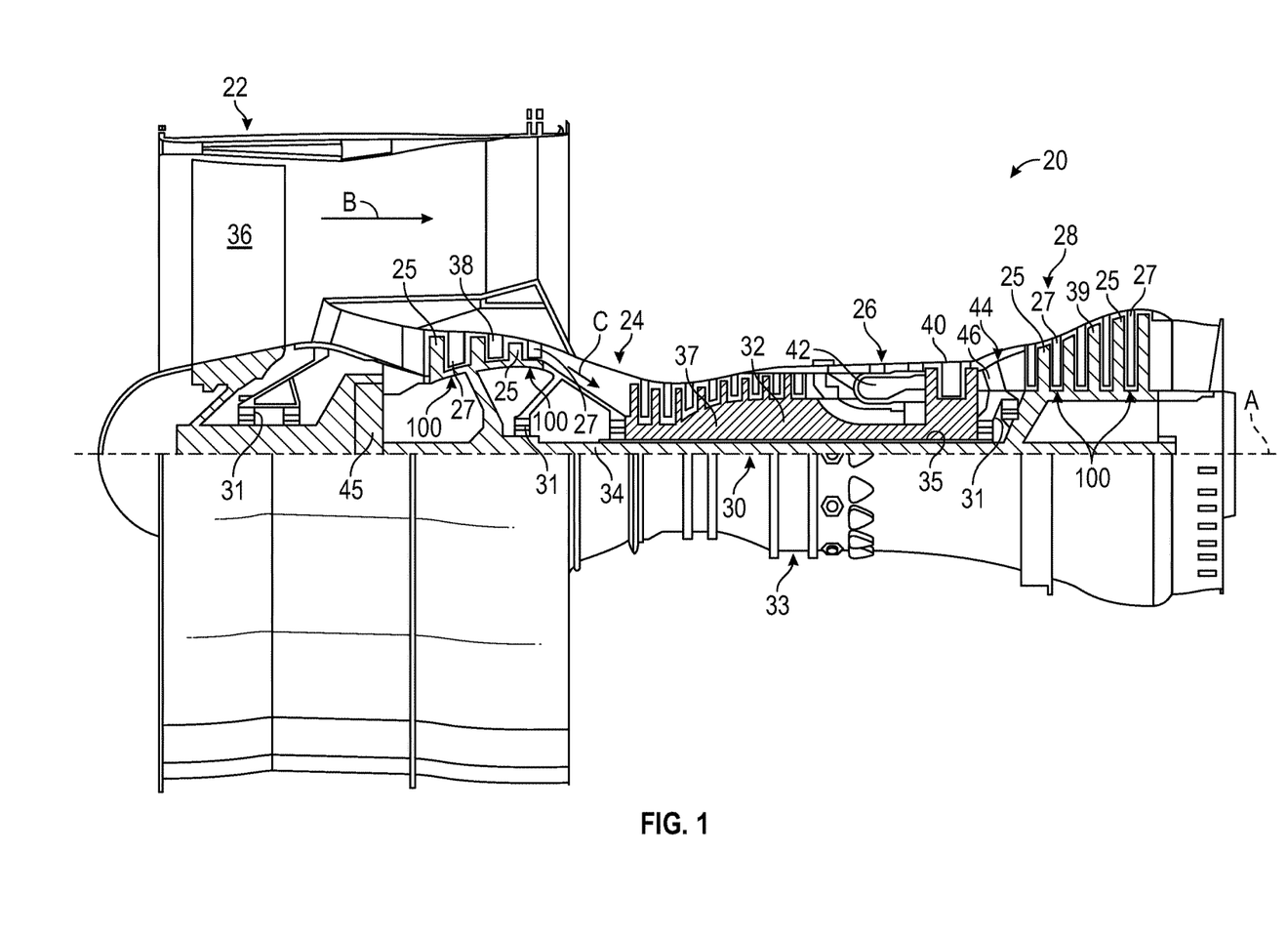
FIG. 1 is a schematic cross-sectional illustration of an embodiment of a gas turbine engine that may employ various embodiments disclosed herein.

FIG. 1 schematically illustrates a gas turbine engine 20 that may employ various embodiments disclosed herein. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a two-spool turbofan gas turbine engine in the disclosed non-limiting embodiment, it should be understood that the concepts described herein are not limited to two-spool turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. The engine 20 in one non-limiting example is a high-bypass geared aircraft engine. In a further example, the engine 20 bypass ratio is greater than about six (6), with an example embodiment being greater than about ten (10), the geared architecture 45 is an epicyclic gear train, such as a planetary gear system or other gear system, with a gear reduction ratio of greater than about 2.3 and the low pressure turbine 39 has a pressure ratio that is greater than about five. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). The geared architecture 45 may be an epicycle gear train, such as a planetary gear system or other gear system, with a gear reduction ratio of greater than about 2.3:1. It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of [(Tram ° R)/(518.7° R)]0.5, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and stator assemblies 100 that carry airfoils that extend into the core flow path C. For example, the rotor assemblies can carry a plurality of rotating blades 25, while each stator assembly 100 can carry a plurality of guide vanes 27 that extend into the core flow path C. The blades 25 of the rotor assemblies create or extract energy (in the form of pressure) from the core airflow that is communicated through the gas turbine engine 20 along the core flow path C. The guide vanes 27 of the stator assemblies 100 direct the core airflow to the blades 25 to either add or extract energy.

Various components of a gas turbine engine 20, including but not limited to the airfoils of the blades 25 and the guide vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation.

Figure 2:
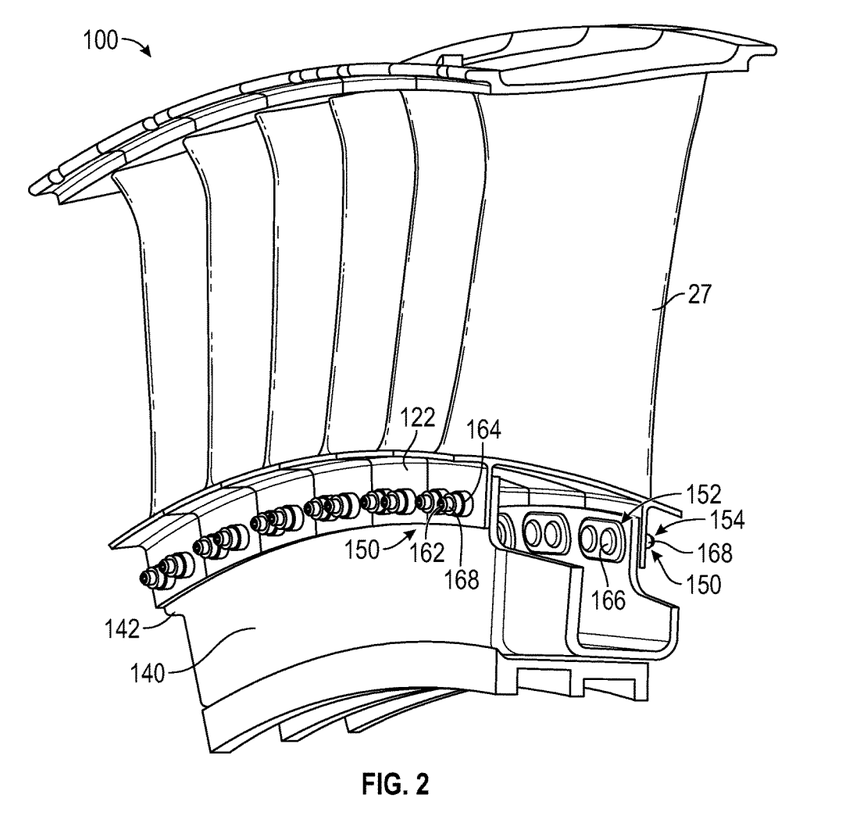
FIG. 2 is a perspective view of stator assembly without a fastener retention mechanism, according to various embodiments of the present disclosure.
Figure 3:
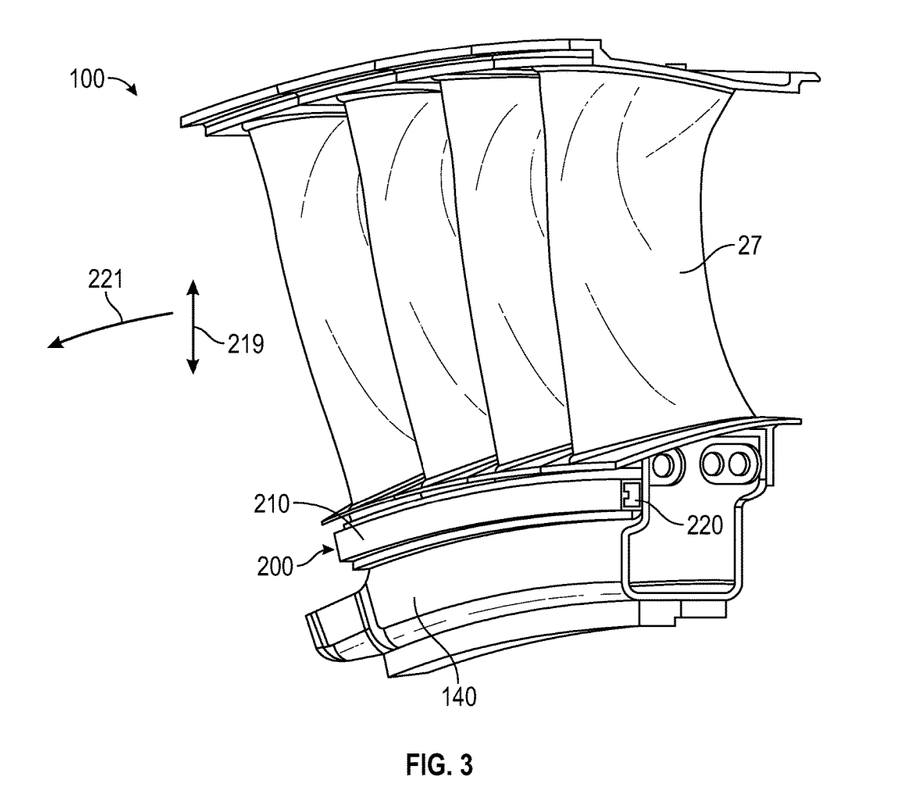
FIG. 3 is a perspective view of a stator assembly with a fastener retention mechanism, according to various embodiments of the present disclosure.

FIG. 2 shows a perspective view of stator assembly 100 without a fastener retention mechanism, according to embodiments of the present disclosure. The stator assembly 100 comprises an inner air seal carrier 140 comprising a mounting body 142 for securing to an end 122 of each of a plurality of guide vanes 27. The stator assembly 100 further comprises a plurality of fasteners 150 to secure each of the plurality of guide vanes 27 to the mounting body 142. The fasteners 150 have a first end 152 and a second end 154. In the illustrated embodiment, the fasteners 150 each comprise a nut 164 and a bolt 162, as seen in FIG. 2. The bolt 162 has a head 166 at the first end 152 of the fastener 150 and a threaded portion 168 at the second end 154 of the fastener 150. The nut 164 is secured to the bolt 162 at the threaded end 168. In one implementation the nut 164 and bolt 162 may be self-locking. In another implementation, the bolt 162 may be a HI-LOK threaded pin and the nut 164 may be a threaded collar with a removable wrenching element that breaks off at a selected torque during installation. As mentioned above, secondary sources of retention of the fasteners or the fasteners themselves may create unwanted drag in the engine 20. Moreover, should portions of the fasteners or the nuts themselves become dislodged during operation of the engine 20 it is undesirable to have them passing though the engine 20.

Referring now to FIGS. 3-6, a stator assembly 100 with a fastener retention mechanism 200, according to various embodiments of the present disclosure is illustrated. The fastener retention mechanism 200 provides several useful features in that it encases or retains the fasteners of the stator assembly 100 in a cavity or channel such that should portions of the fasteners or the nuts themselves become dislodged, they will be retained in the fastener retention mechanism 200 so that no further damage may occur. In addition, the fastener retention mechanism 200 also provides a low profile or smooth surface that does not adversely affect air flow through the engine while also providing a fastener retention mechanism. Still further, a cover 210 of the fastener retention mechanism 200 is configured to snap-fit and/or slidably engage a base 220 of the fastener retention mechanism 200. Accordingly and in one non-limiting embodiment, the cover 210 is configured to be releasably secured to the base 220 only by the interlocking of the cover 210 to the base 220 without any additional fasteners.

Figure 4:
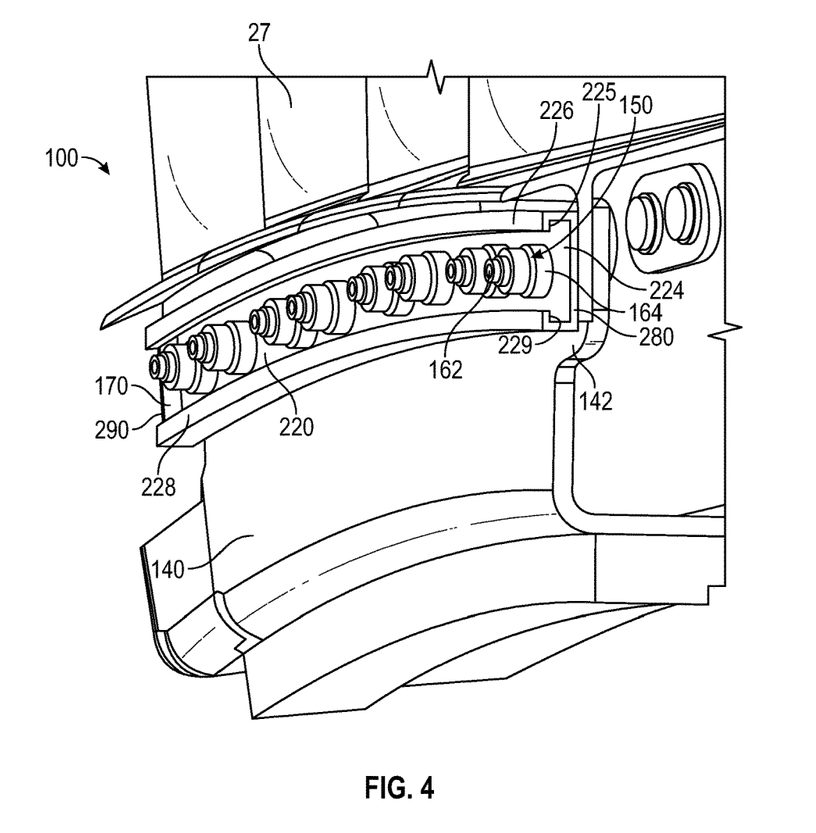
FIG. 4 is an enlarged perspective view of a base of the fastener retention mechanism of FIG. 3.

As shown in the illustrated embodiment of FIG. 4, the base 220 may be secured to the stator assembly 100 proximate to the mounting body 142 and the ends 122 of the guide vanes 27 by the fasteners 150. The base 220 has a base surface 224 and a first rail 226 and an opposite second rail 228 extending upwardly and away from the base surface. As illustrated, the first rail 226 and the second rail 228 are in a facing spaced relationship with respect to each other to define a channel therebetween. In order to secure the base 220 to the stator assembly 100, the base surface 224 has a plurality of through holes configured to be aligned with a plurality of mounting holes in the mounting body 142 and a plurality of retention holes in the vanes 27 such that the fasteners 150 can be inserted through the holes of the vanes 27, mounting body 142 and base 220 so that the base 220 and vanes 27 can be simultaneously secured to the stator assembly 100.

For example, bolt 162 of each one of the fasteners 150 is inserted through all three holes simultaneously and then the corresponding nut 164 of each one of the fasteners 150 is threaded onto the threaded portion of the bolt 162 that extends past the base surface 224 of the base 220. The diameter of the nut 164 is greater that the diameter of the hole in the base surface 224 of the base 220 such that when tightened, the nut 164 secures the base 220, the mounting body 142 of the inner air seal carrier 140, and the guide vanes 27 together, as shown in FIG. 4. In addition, the head 166 of the bolt is greater than any opening the bolt 162 passes through. As illustrated and when the base 220 is secured to the stator assembly 100, the nut 164 and the portion of the bolt 162 extending past the base surface 224 of the base 220 are located between in the channel between the first rail 226 and the second rail 228. This allows the nuts 164 to be enclosed by cover 210 and the base 220 of the fastener retention mechanism 200 when the cover 210 is secured to the base 220. As mentioned above, the cover 210 will capture any portion of the fasteners that may become dislodged and the cover 210 has a low profile or smooth surface that minimizes drag on the stator assembly 100 attributable to the fasteners 150. As illustrated, the base 220 and its associated cover 210 are complementary elongated members configured to encase a plurality of fasteners 150 therebetween.

Figure 5:
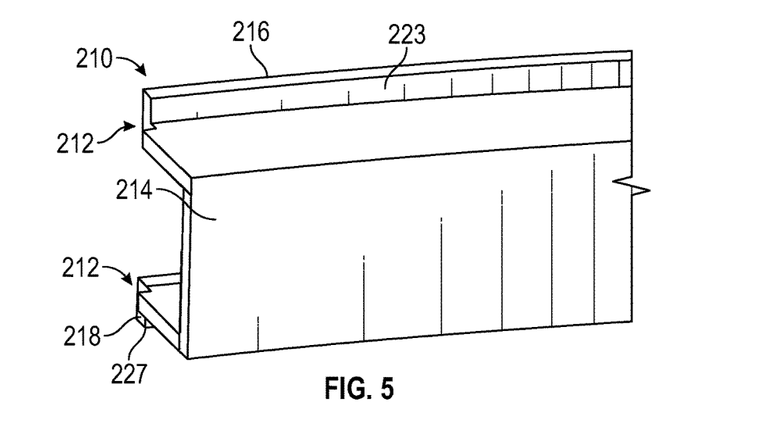
FIG. 5 is an enlarged perspective view of a cover of the fastener retention mechanism of FIG. 3.

As illustrated in FIG. 5, in one embodiment the cover 210 comprises a first foot 216, a second foot 218, and a cover surface 214 extending between the first foot 216 and the second foot 218. In FIG. 5, the cover 210 is illustrated as having a rectangular cross-section or profile with an arcuate shape however it is, of course, understood that various configurations, geometries, sizes, shapes, etc. may be used for cover 210 without departing from the scope of the present disclosure. For example, a cover 210 with a round cross-section or profile may be used. In one embodiment, the cover 210 and the base 220 may be composed of a light weight material, such as for example, thin metal sheet, bar stock, composite laminate or any other type of suitable light weight material known to one of ordinary skill in the art. In another embodiment, the cover 210 may include a plurality of holes and/or scallops to reduce its weight.

In order to releasably engage the base 220, the first foot 216 of the cover 210 is configured to interlock with the first rail 226 and the second foot 218 is configured to interlock with the second rail 228. In one implementation and to operably connect the cover 210 with the base 220, a distal end of the first foot 216 and the second foot 218 of the cover 210 slide into place behind a distal end of the first rail 226 and the second rail 228 respectively, from an open end of the base 220.

Figure 6:
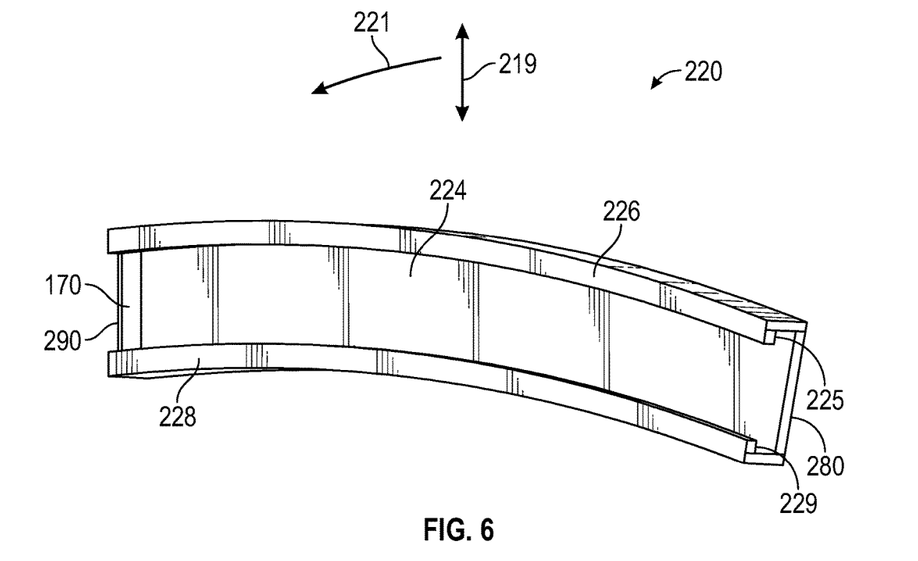
FIG. 6 is an enlarged schematic view of the base of the fastener retention mechanism of FIG. 3.

For example and in one embodiment, the cover 210 may be slid into place from a first open end 280 towards a second opposite end 290 (FIG. 4). In order to prevent further movement of the cover 210, an anti-rotation lug or member 170 is located proximate to the second end 290 of the base 220 as illustrated in FIG. 6. The anti-rotation lug or member 170 is secured to the base 220 and extends away from the base surface 224 into an open space located between the base 220 and the cover 210. In one non-limiting embodiment, the anti-rotation lug or member 170 may extend perpendicularly from the base surface 224. The anti-rotation lug or member 170 may be secured to the base 220 by various methods, such as, for example: if the base 220 is formed by machining from bar stock, the anti-rotation lug or member 170 may be formed during the machining process; if the base 220 is formed by turning on a lathe, the anti-rotation lug or member 170 may brazed in place aft turning; if the base 220 is formed by bending sheet metal, the anti-rotation lug or member 170 may be formed by bending a tab at the second end 290 to about a 90° angle; if the base 220 is formed by casting, the anti-rotation lug or member 170 may be included in a mold of the casting process; if the base 220 is formed by laser printing, the anti-rotation lug or member 170 may be printed as a feature; or if the base 220 is formed by a composite layup process, the anti-rotation lug or member 170 may be included in the ply layup. When the cover 210 is secured to the base 220, the configuration of the anti-rotation lug or member 170 prevents motion between the cover 210 and the base 220, which in one embodiment may be rotational motion in direction of arrow 221. As illustrated in FIG. 6, the cover 210 includes a notch 212 that allows the cover 210 to come into contact with the anti-rotation lug or member 170 and also cover the anti-rotation lug. In this embodiment, the first foot 216 and the second foot 218 abut the anti-rotation lug or member 170, thus preventing rotational movement of cover 210 with respect to the base 220 in the direction of arrow 219. The movement of the cover 210 in a direction opposite to arrow 221 may be prevented by a cover and/or an anti-rotation lug or member of an adjacent stator assembly abutting the first end 280.

As may be appreciated by one of skill in the art, multiple stator assemblies 100 are assembled together in a ring to form a complete circle of guide vanes for installation into the gas turbine engine. The stator assembly 100 may include multiple anti-rotation lugs or members 170. The stator assembly 100 may also include mechanisms, which prevent the cover 210 from moving relative to the base 220, such as, for example an adhesive or other similar material known to one of ordinary skill in the art.

In an alternative embodiment, the cover 210 may be composed of an elastically deformable material having resilient characteristics, allowing an assembler to pinch the cover 210 via an applied force, bringing the first foot 216 and the second foot 218 close enough together in order to place them between the first rail 226 and the second rail 228 and then secure the cover 210 into place, with the first foot 216 behind the first rail 226 and the second foot 218 behind the second rail 228. In other words, the applied force compresses the first foot 216 and the second foot 218 towards each other against a biasing force of the cover 210 in order to insert the first foot 216 and the second foot 218 between the first rail 226 and the second rail 228. Once inserted, the applied force is released and the first foot 216 and the second foot 218 expand outwardly towards the first rail 226 and the second rail 228, due to the resilient characteristics of the cover 210 so that it is now engaged with the base 220. As such, the cover 210 can snap fittingly and/or slidably engage the base 220 by only the interlocking of the first foot 216 and the second foot 218 with the first rail 226 and the second rail 228. In one embodiment, the first foot 216 has a flange or engagement ledge 223 configured to engage a flange or engagement ledge 225 of the first rail 226 and the second foot 218 has a flange or engagement ledge 227 configured to engage a flange or engagement ledge 229 of the second rail 228.

Figure 7:
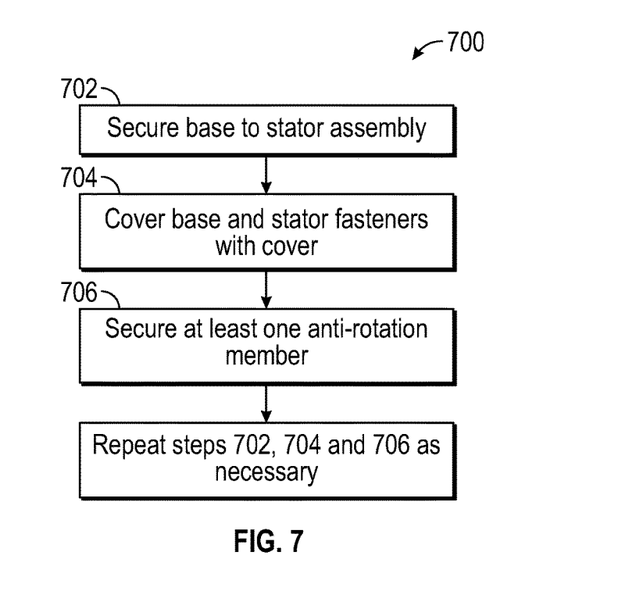
FIG. 7 is a flow chart illustrating a method of securing a fastener retention mechanism to a stator assembly according to various embodiments of the present disclosure.

Referring now to FIG. 7, a flow chart illustrating a method 700 for assembling a stator assembly 100 in accordance with one non-limiting embodiment of the present disclosure is shown. At block 702, a base 220 comprising a first rail, an opposite second rail, and a base surface between the first rail and second rail is secured to an air seal carrier of at least one guide vane with a plurality of fasteners. At block 704, a cover 210 comprising a first foot, a second foot, and a cover surface extending between the first foot and the second foot is secured to the base after it has been secured to the stator assembly, wherein the first foot interlocks with the first rail and the second foot interlocks with the second rail. At block 706, at least one anti-rotation lug is secured to the base 220. The anti-rotation lug prevents motion between the cover and the base. Thereafter, steps 702, 704 and 706 (if necessary) are repeated until the desired amount of fastener retention mechanisms 200 are secured to the stator assembly 100.

While the above description has described the flow process of FIG. 7 in a particular order, it should be appreciated that unless otherwise specifically required in the attached claims that the ordering of the steps may be varied.

Advantageously, a fastener retention mechanism as provided herein may enable retention and/or capture of fasteners that may become loose/and or broken, thus preventing entry into the rotating components of the gas turbine engine. Further advantageously, embodiments provided herein may enable drag reduction for the stator assembly by encasing the fasteners in the fastener retention mechanism.

Technical effects of embodiments of the present disclosure include a fastener retention mechanism to retain and/or capture fasteners that may become loose and/or broken. Further technical effects may include reduced risk of loosened and/or broken fasteners impacting rotating components of the gas turbine engine. Further technical affects may include reduced drag around fasteners by encasing the fasteners in the fastener retention mechanism.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A fastener retention mechanism for retaining fasteners of a stator assembly in a gas turbine engine, the fastener retention mechanism comprising:
   a base having a first rail and a second rail and a base surface extending therebetween, the first rail and the second rail being in a facing spaced relationship with respect to each other and define a channel extending therebetween;
   a cover releasably connected to the base, the cover comprising a first foot, a second foot, and a cover surface extending between the first foot and the second foot, wherein the first foot and the second foot are configured to interlock with the first rail and the second rail, respectively, such that the channel is covered by the cover surface when the cover is secured to the base; and
   wherein the cover is secured to the base by the interlocking of the first foot and the second foot with the first rail and the second rail,
   wherein the first rail and the second rail each have a ledge configured to engage a ledge of the first foot and the second foot, respectively.

2. The fastener retention mechanism of claim 1, wherein the cover is formed from an elastically deformable material.

3. The fastener retention mechanism of claim 1, wherein the cover and the base have an arcuate shape.

4. The fastener retention mechanism of claim 1, wherein the cover and the base have a rectangular profile.

5. The fastener retention mechanism of claim 1, wherein the cover surface is configured to reduce drag of the stator assembly.

6. The fastener retention mechanism of claim 1, further comprising an anti-rotation member secured to the base, wherein the anti-rotation member is configured to prevent rotational movement of the cover with respect to the base when the cover is secured to the base.

7. The fastener retention mechanism of claim 6, wherein the cover has a notch portion at one end, the notch portion being configured to engage the anti-rotation member when the cover is secured to the base.

8. The fastener retention mechanism of claim 1, wherein the cover and the base are each elongated U shaped members.

9. A stator assembly for a gas turbine engine, the stator assembly comprising:
   an inner air seal carrier having a mounting body;
   a plurality of guide vanes secured to the mounting body via a plurality of fasteners; and
   a fastener retention mechanism secured to the mounting body via the plurality of fasteners, the fastener retention mechanism comprising: a base having a first rail and a second rail and a base surface extending therebetween, the first rail and the second rail being in a facing spaced relationship with respect to each other and define a channel extending therebetween; a cover releasably connected to the base, the cover comprising a first foot, a second foot, and a cover surface extending between the first foot and the second foot, wherein the first foot and the second foot are configured to interlock with the first rail and the second rail, respectively, such that the channel is covered by the cover surface when the cover is secured to the base; wherein the cover is secured to the base by the interlocking of the first foot and the second foot with the first rail and the second rail; and
   wherein portions of the plurality of fasteners are enclosed between the cover and the base,
   wherein the first rail and the second rail each have a ledge configured to engage a ledge of the first foot and the second foot, respectively.

10. The stator assembly of claim 9, wherein the cover is formed from an elastically deformable material.

11. The stator assembly of claim 9, wherein the cover and the base have an arcuate shape.

12. The stator assembly of claim 9, wherein the cover and the base have a rectangular profile.

13. The stator assembly of claim 9, wherein the cover surface is configured to reduce drag of the stator assembly.

14. The stator assembly of claim 9, further comprising an anti-rotation member secured to the base, wherein the anti-rotation member is configured to prevent rotational movement of the cover with respect to the base when the cover is secured to the base.

15. The stator assembly of claim 14, wherein the cover has a notch portion at one end, the notch portion being configured to engage the anti-rotation member when the cover is secured to the base.

16. A method for encasing a plurality of fasteners securing a plurality of guide vanes to a mounting body of an inner air seal carrier, comprising:
   securing the plurality of guide vanes to the mounting body via the plurality of fasteners;

securing a base of a fastener retention mechanism to the mounting body via the plurality of fasteners simultaneous to securing the plurality of guide vanes to the mounting body via the plurality of fasteners, the base having a first rail and a second rail and a base surface extending therebetween, the first rail and the second rail being in a facing spaced relationship with respect to each other to define a channel extending therebetween and wherein portions of the fasteners are located in the channel; and releasably securing a cover to the base, the cover comprising a first foot, a second foot, and a cover surface extending between the first foot and the second foot, wherein the first foot and the second foot are configured to interlock with the first rail and the second rail, respectively, such that the channel is covered by the cover surface when the cover is secured to the base; wherein the cover is secured to the base by the interlocking of the first foot and the second foot with the first rail and the second rail; and wherein the portions of the fasteners located in the channel are enclosed between the cover and the base when the cover is secured to the base, wherein the first rail and the second rail each have a ledge configured to engage a ledge of the first foot and the second foot, respectively.

17. The method of claim 16, wherein the cover is formed from an elastically deformable material.

18. The method of claim 16, wherein the cover and the base have an arcuate shape.

19. The method of claim 16, wherein the cover and the base have a rectangular profile.

20. The method of claim 16, wherein the cover surface is configured to reduce drag of the stator assembly.

* * * * *